US009747952B2

(12) United States Patent
Dold et al.

(10) Patent No.: US 9,747,952 B2
(45) Date of Patent: Aug. 29, 2017

(54) STORAGE DEVICE OF MEDIA UNITS

(76) Inventors: Robert Alan Dold, Fairfax, VA (US);
Elizabeth Thomas Dold, Fairfax, VA (US)

(*) Notice: Subject to any disclaimer, the term of this patent is extended or adjusted under 35 U.S.C. 154(b) by 740 days.

(21) Appl. No.: 12/579,992

(22) Filed: Oct. 15, 2009

(65) Prior Publication Data

US 2011/0089062 A1   Apr. 21, 2011

(51) Int. Cl.
*B65D 85/57*  (2006.01)
*G11B 33/04*  (2006.01)
*A47B 81/06*  (2006.01)
*B43L 3/00*   (2006.01)

(52) U.S. Cl.
CPC ........ *G11B 33/0405* (2013.01); *A47B 81/068* (2013.01); *B43L 3/005* (2013.01); *B43L 3/008* (2013.01)

(58) Field of Classification Search
USPC .............. 206/387.1, 308.1, 311, 312, 313
See application file for complete search history.

(56) References Cited

U.S. PATENT DOCUMENTS

| | | | | | |
|---|---|---|---|---|---|
| 4,253,567 | A | * | 3/1981 | Goldammer | 206/387.13 |
| 4,255,872 | A | * | 3/1981 | Williams, Sr. | 434/308 |
| 4,717,021 | A | * | 1/1988 | Ditzig | 206/387.13 |
| 4,757,901 | A | * | 7/1988 | Woods | 206/575 |
| 5,024,332 | A | * | 6/1991 | Stachler | 206/575 |
| 5,121,837 | A | * | 6/1992 | Holze | 206/387.1 |
| 5,311,993 | A | * | 5/1994 | Koch | 206/307.1 |
| 5,515,972 | A | * | 5/1996 | Shames | 206/425 |
| 6,082,545 | A | * | 7/2000 | Ford et al. | 206/579 |
| 6,193,118 | B1 | * | 2/2001 | Kearl | 224/153 |
| 6,202,839 | B1 | * | 3/2001 | Petersen et al. | 206/308.1 |
| 6,981,593 | B1 | * | 1/2006 | Klodt | 206/541 |
| 7,093,595 | B2 | * | 8/2006 | Nesbitt | 128/203.15 |
| 2004/0262185 | A1 | * | 12/2004 | Mills | 206/483 |
| 2006/0144723 | A1 | * | 7/2006 | Fuller | 206/5 |
| 2008/0017537 | A1 | * | 1/2008 | Inskeep et al. | 206/350 |

* cited by examiner

Primary Examiner — Jacob K Ackun

(57) ABSTRACT

A method, system and apparatus for media storage is described. In one embodiment, an apparatus for storing media units has a housing having a lid and a base. The base has a plurality of receptacles. Each of the plurality of receptacles has a plurality of walls. A first writing surface is coupled to the housing.

17 Claims, 16 Drawing Sheets

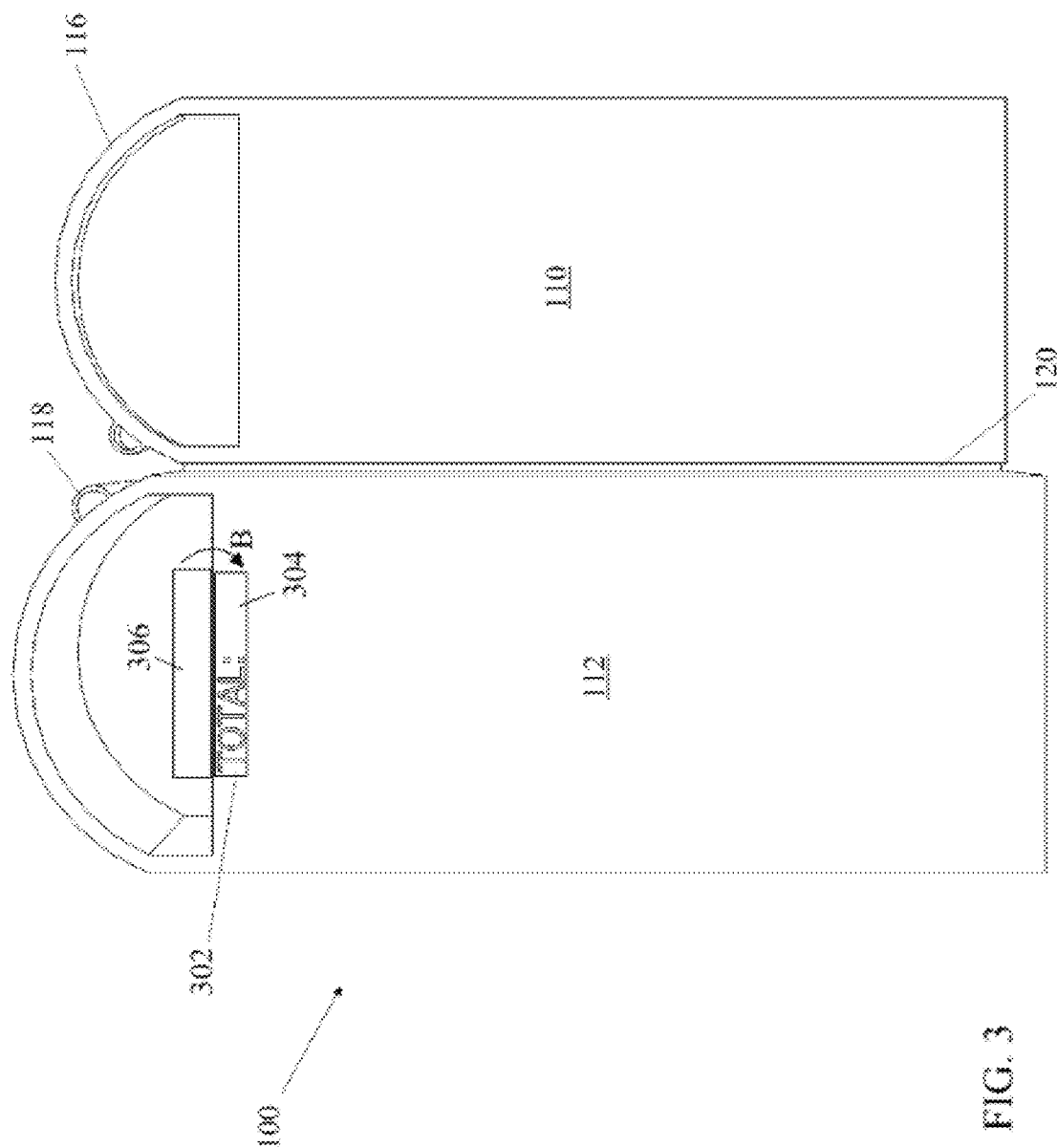

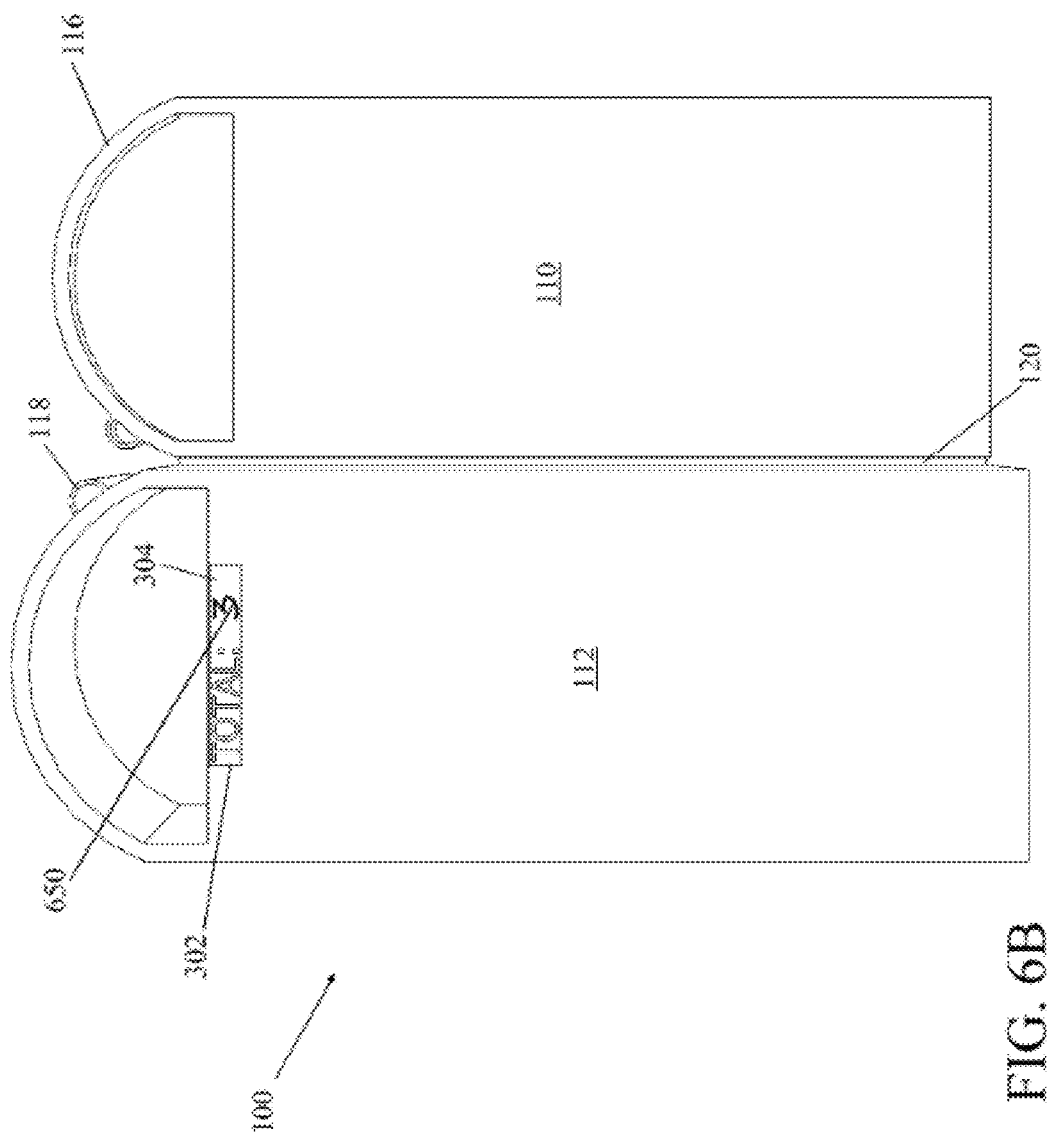

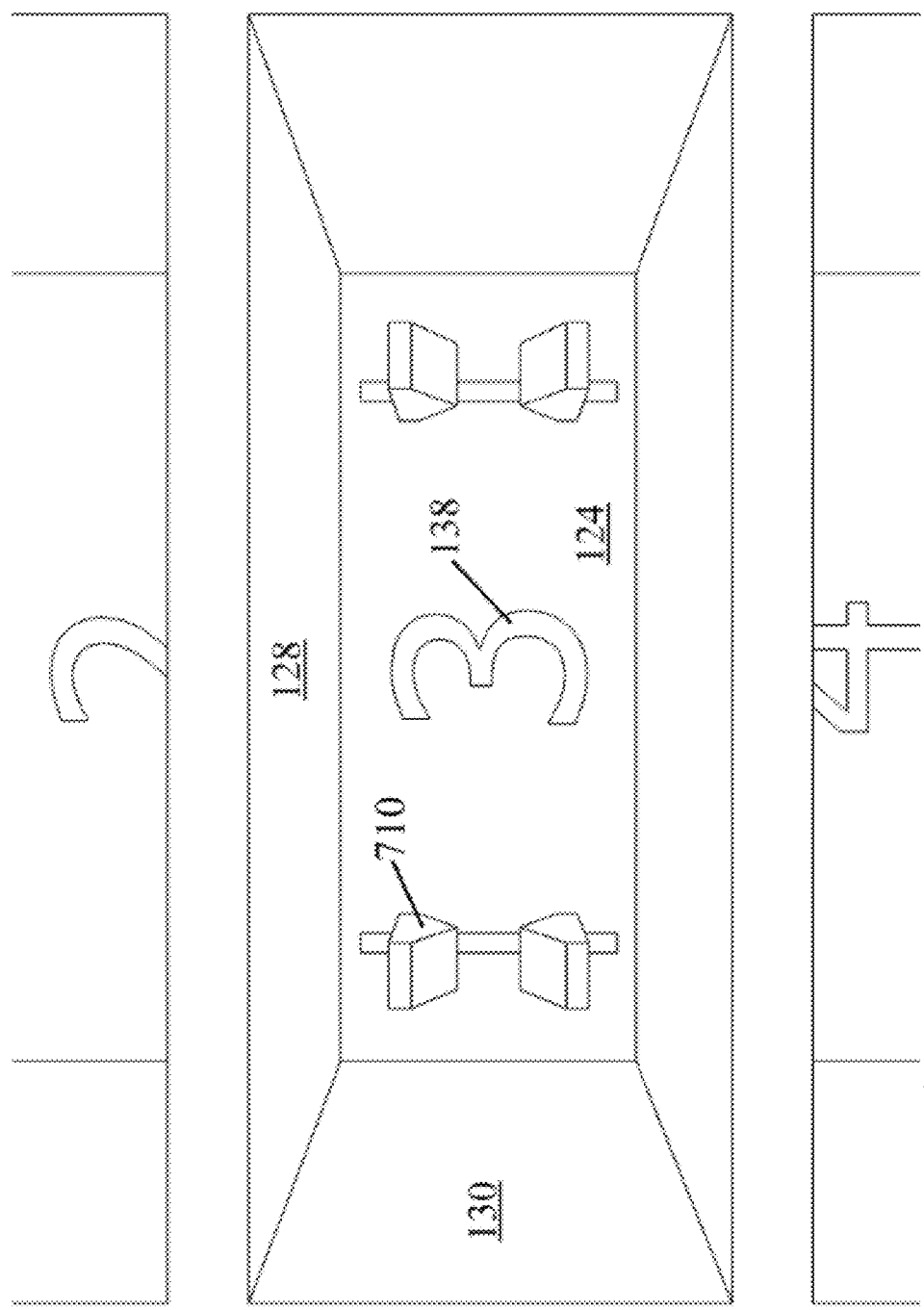

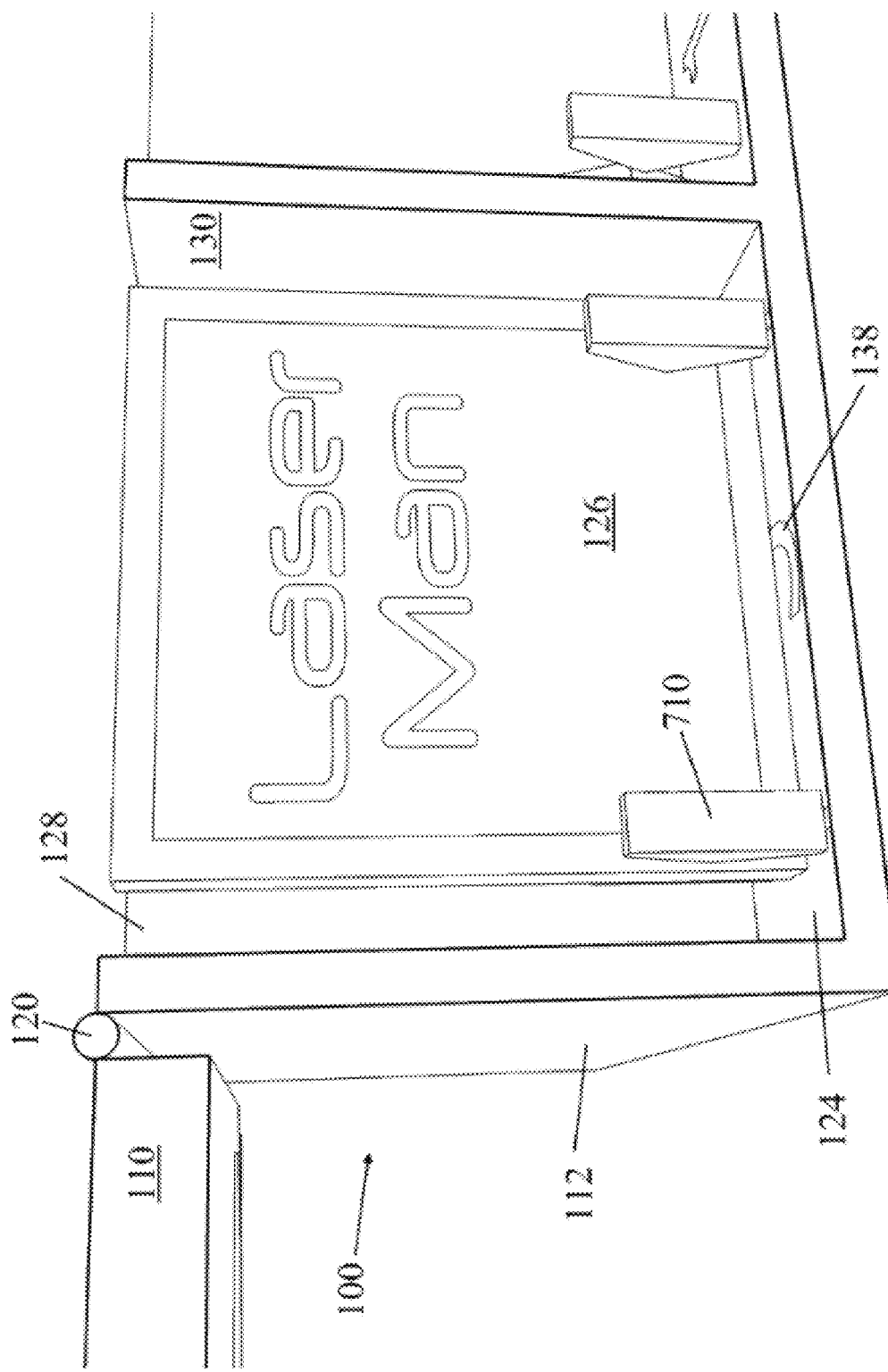

STORAGE DEVICE OF MEDIA UNITS

FIELD OF THE INVENTION

The present disclosure relates generally to storage devices. More particularly, the present disclosure relates to devices for media storage.

BACKGROUND OF THE INVENTION

Media data such as music, movies, or games are generally saved on media units. These media units may include discs, tapes, or cartridges. These units are inserted into media players for playback. Modern media units are generally small in size and can be easily misplaced or lost.

To organize and keep track of media units, media units are often inserted into storage devices to prevent them from being lost. These storage devices may be stationary or transportable. Users can take transportable storage devices with them while traveling to keep their collection of stored media units accessible.

SUMMARY

The invention pertains to a device to store media units that allows a user to easily recognize which media units are stored in the device. The device may have a lid and a base connected by a hinge. The base may contain a plurality of receptacles configured to receive media units. The device may have a first writing surface with designated regions for making notations about the media units stored within the device. The device may also have a second writing surface with a dedicated region for recording the total number of media units stored within the device. Either or both of these writing surfaces may be erasable. The first and second writing surface may provide a user with information that can be used to showcase or display the media units stored within the device, ensure that all of the media units are stored within the device, and/or find and replace any missing media units to prevent loss.

In a first embodiment, an apparatus for storing media units has a housing having a lid and a base. The base has a plurality of receptacles. Each of the plurality of receptacles has a plurality of walls. A first writing surface can be coupled to the housing.

In another embodiment, an apparatus for storing cartridges has a housing with a lid, a base and a plurality of receptacles. The lid has a first interior, a first exterior, a first front edge, and a first back edge. The base has a second interior, a second exterior, a second front edge, and a second back edge. The second back edge of the base is connected to the first back edge of the lid with a hinge. Each receptacle each has a plurality of walls. The plurality of walls is coupled to the second interior of the base. The first writing surface can be coupled to the lid of the housing. The first writing surface can have a plurality of regions to label cartridges. Each region can correspond to a receptacle.

In another embodiment, a method for organizing media units within a portable container having a plurality of receptacles and an erasable writing surface involves inserting media units into the plurality of receptacles within the portable container. Descriptive information about the media units provided within the receptacles can be written on the erasable writing surface. A total number of the media units provided within the receptacles can be determined. The total number of the media units can be recorded on the housing.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings:

FIG. 3 shows a bottom view of the device illustrated in FIG. 1.

FIGS. 6A and 6B illustrate exemplary notations made on the first writing surface and the second writing surface.

FIGS. 7A-7C illustrate close-up views of the receptacle of the device having at least one mechanical member.

DETAILED DESCRIPTION OF EXEMPLARY EMBODIMENTS

Figure 1:
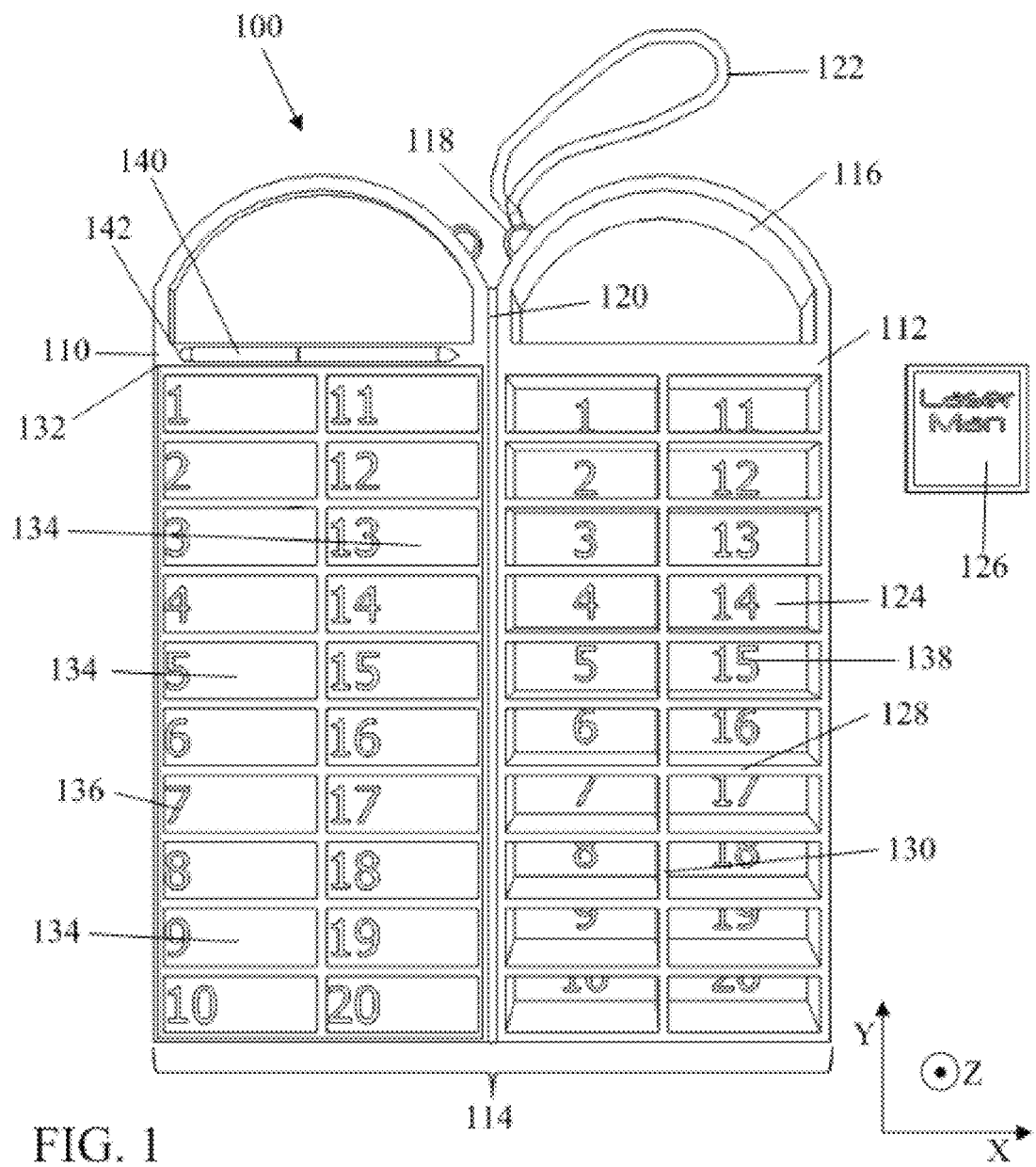
FIG. 1 illustrates a top view of a device to store media units according to one embodiment.

Embodiments are described herein in the context of a Storage Device For Media Units. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The invention pertains to a device to store media units that allows a user to easily recognize which media units are stored in the device. The device may have a lid and a base connected by a hinge. The base may contain a plurality of receptacles configured to receive media units. The device may have a first writing surface with designated regions for making notations about the media units stored within the device. The device may also have a second writing surface with a dedicated region for recording the total number of media units stored within the device. Either or both of these writing surfaces may be erasable. The first and second writing surface may provide a user with information that can be used to showcase or display the media units stored within the device, ensure that all of the media units are stored within the device, and/or find and replace any missing media units to prevent loss.

Media items are costly and easily misplaced, particularly with smaller children. Advantageously, the device can be used to organize, store, display, transport, share units, and prevent loss of media units. For example, when packing for a trip, a parent will take the device and note in a writing area the total number of units they are taking on the trip, which corresponds to the number of units in the device. When subsequently leaving the vacation destination, the parent can confirm that all the units are not lost or if missing can check the notation for the unit name that is missing and/or who signed it out so as to be able to track down the missing unit. The writing surface can also facilitate using a single storage device for multiple users, e.g., an owner's name written with the name in the writing surface, and/or if a unit is temporarily removed, then the initials of the current user can be written to prevent loss or transport. The device also allows users to display and showcase their collections.

FIG. 1 illustrates a top view of a device to store media units according to one embodiment. The device 100 is also shown in an open position in FIG. 1. The device 100 may have a lid 110 and a base 112 coupled together with a hinge 120 to form a housing 114. The housing 114 may have an interior and an exterior. A handle 116 may be integrated with or coupled to the housing 114 to allow the user to carry the device 100. The handle 116 may be coupled to any portion of the housing, including but not limited to the base 112, the lid 110, or both the base 112 and the lid 110. The handle 116 may allow the user to carry the device 100.

The device 100 may have an aperture 118. The aperture 118 may be disposed on the housing 114 such as on the base 112, the lid 110, both the base 112 and the lid 110, or at any other portion of the housing 114. The aperture 118 may be designed to receive a carrying means 122 to allow a user to transport the device easily. The carrying means 122 may be a strap, clip, lanyard, carabiner, hook, or any other similar known means to assist the user in carrying the device 100. For example, the carrying means 122 may be attached to a purse, belt-loop, backpack, bicycle handlebars, or any other desired item with a suitable point for attachment.

The interior of the housing 114 may have a plurality of receptacles 124 in the base 112 that can receive a media unit 126. The user can insert a media unit 126 into one of the receptacles 124 to store the media unit 126 within the device 100. The receptacles 124 can be any shape or size. For example, the base 112 may have between about one to fifty receptacles 124. However, the number of receptacles 124 is not intended to be limiting as any number of receptacles 124 may be used. The receptacles 124 may be arranged in rows, separated by latitudinal walls 128 along the x-axis. The receptacles 124 may also be arranged in columns, separated by longitudinal walls 130 along the y-axis. The height of latitudinal walls 128 and longitudinal walls 130 may be similar to the height of the base 112. However, the height is not intended to be limiting as latitudinal walls 128 and longitudinal walls 130 may be any height necessary to form the receptacles 124. The receptacles 124 may each be identified with a receptacle number 138.

The media units 126 may contain any type of media or data. For example, the media unit 126 may be any type of cartridge, including a video game cartridge used by a Nintendo DS™, Sony Wii™, Nintendo Game Boy Advance™, Nintendo Game Boy™, or Leapster Leapfrog™. Often, these cartridges may be of different sizes. However, in general the media unit 126 may be any other type of media unit 126 such as a disc used by a Sony PSP™, compact disc, digital video disc, or the like.

The receptacles 124 may be configured to receive one of the media units 126 vertically along the z-axis of the device 100. Inserting the media units 126 into the receptacles 124 vertically along the z-axis improves the amount of media units 126 that can be stored compared with inserting the media units 126 in a horizontal manner along a flat plane defined by the x and y axes. However, this is not intended to limit the orientation of the receptacles 124, as the receptacles 124 may be configured in any direction or orientation.

The device 100 may also have a first writing surface 132 coupled to the interior of the lid 110 or anywhere else on the housing 114. The first writing surface 132 may allow a user to record the names of the media units 126 that are stored in the receptacles 124, or record any other desired information (e.g., name of unit, owner, current user, date). This allows the user to keep track of media units 126 and easily locate the media units 126 stored in the device 100 as well as showcase and display the user's collection of media units.

The first writing surface 132 may have a plurality of designated regions 134, where each of the designated regions 134 corresponds to one of the receptacles 124. FIG. 1 shows an embodiment where there are twenty (20) designated regions 134 on the first writing surface 132, with each of the designated regions 134 set slightly away from the edges of the first writing surface toward the interior of the first writing surface 132. Each of the designated regions 134 may be identified with a region number 136 that is associated with a corresponding receptacle 124 or receptacle number 138 associated with the corresponding receptacle 124. The user can make use of the information written on the first writing surface 132 to quickly locate a desired one of the media units 126 stored in the device 100. The user can display or showcase the collection of media units stored in the device 100 by opening the lid 110 and allowing others to read the information written in any of the designated regions 134 on the first writing surface 132. The first writing surface 132 may be any size, but may preferably be the same size as the total area of the combined receptacles 124. Each of the designated regions 134 may be the same size as a corresponding one of the receptacles 124, however this is not intended to be limiting as the designated regions 134 may be any size.

Other embodiments of the first writing surface 132 may have additional features. For example, each of the designated regions 134 may have a check box that a user may mark to indicate that the media unit 126 previously stored therein has been removed. There may also be a separate area associated with each of the designated regions 134 where a user may make a separate notation or write the current user's name/initials to indicate the identity of the user who removed the media unit 126. By recording additional information in the separate area, multiple users may remove different media units. If a different user wants to use a particular one of the media units 126 that has already been removed, that user may read the recorded information to determine which other user has the desired media unit 126.

The first writing surface 132 may be erasable. For example, the first writing surface 132 may be a whiteboard, dry erase board, or any other similar erasable surface. When the user inserts, moves, or removes at least one of the media units 126, the erasability of the first writing surface 132 allows the user to update any existing written information on the first writing surface 132 to reflect the change with respect to the at least one media unit 126. This configuration may allow the user to organize his or her collection of media units by keeping accurate information recorded on the first writing surface 132 about the collection of media units stored in the device 100.

A stylus 140 or any type of pen or other writing instrument may be included with the device 100 to assist the user in writing on the first writing surface 132. There may be a stylus holder disposed into the housing 114 to store the stylus 140 when not in use. The stylus holder may be located anywhere on the housing 114 including in the base 110 or the lid 112. The stylus 140 may be positioned either latitudinal along the x-axis or longitudinal along the y-axis in any direction, but this is not intended to be limiting as the stylus may be positioned in any direction. Alternatively, the stylus 140 may be tethered to any portion of the device 100 with a string or any other known tethering mechanism. There may also be an eraser 142 coupled to the end of the stylus 140. In an alternate embodiment, an independent eraser may be included with the device 100. This independent eraser may be a rag, cloth, pad, polymer based erasing material, or any other known erasing material. The device can also include a holder for receiving an instrument for a gaming unit.

Figure 2A:
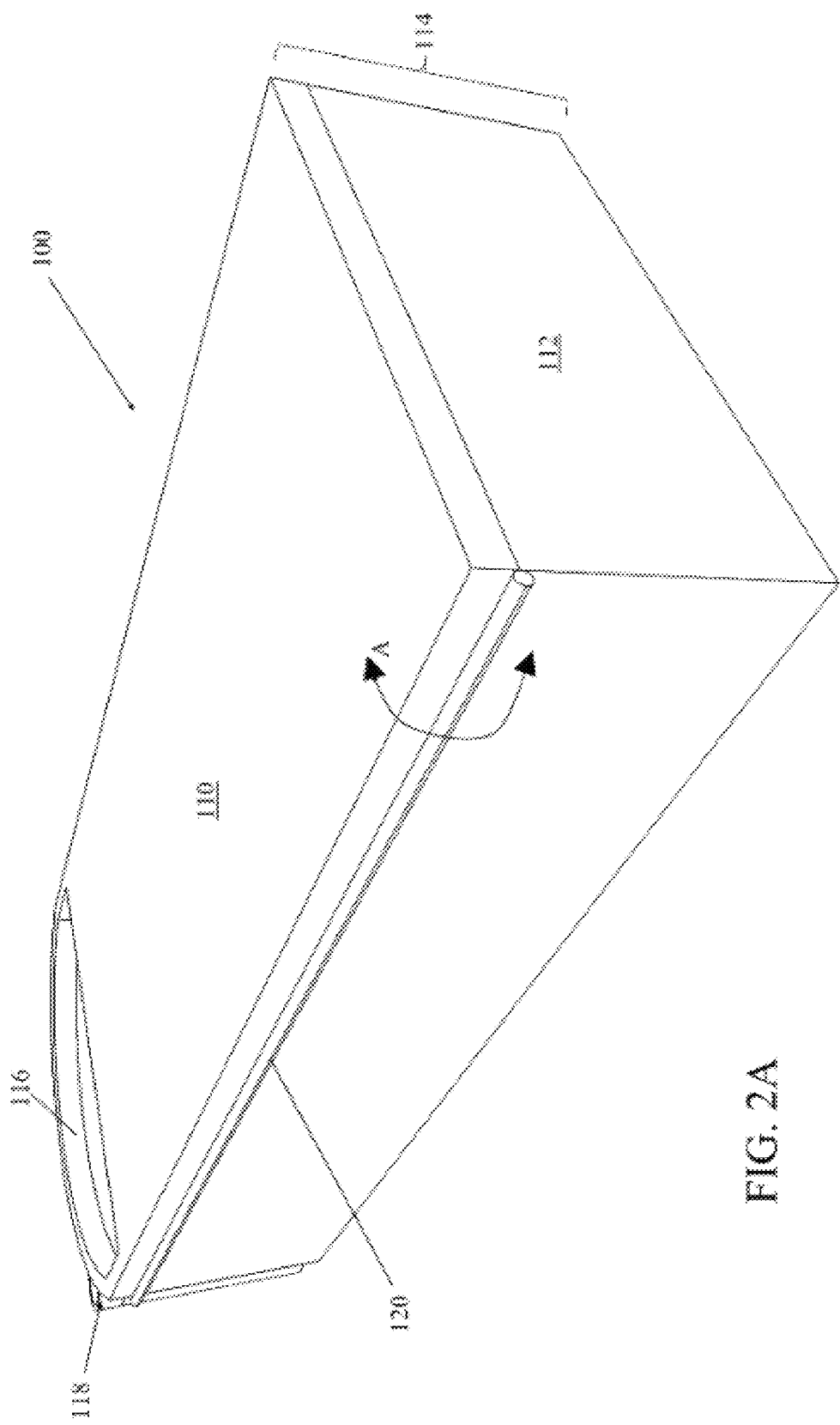
FIGS. 2A and 2B illustrate the device of FIG. 1 in a closed position.
Figure 2B:
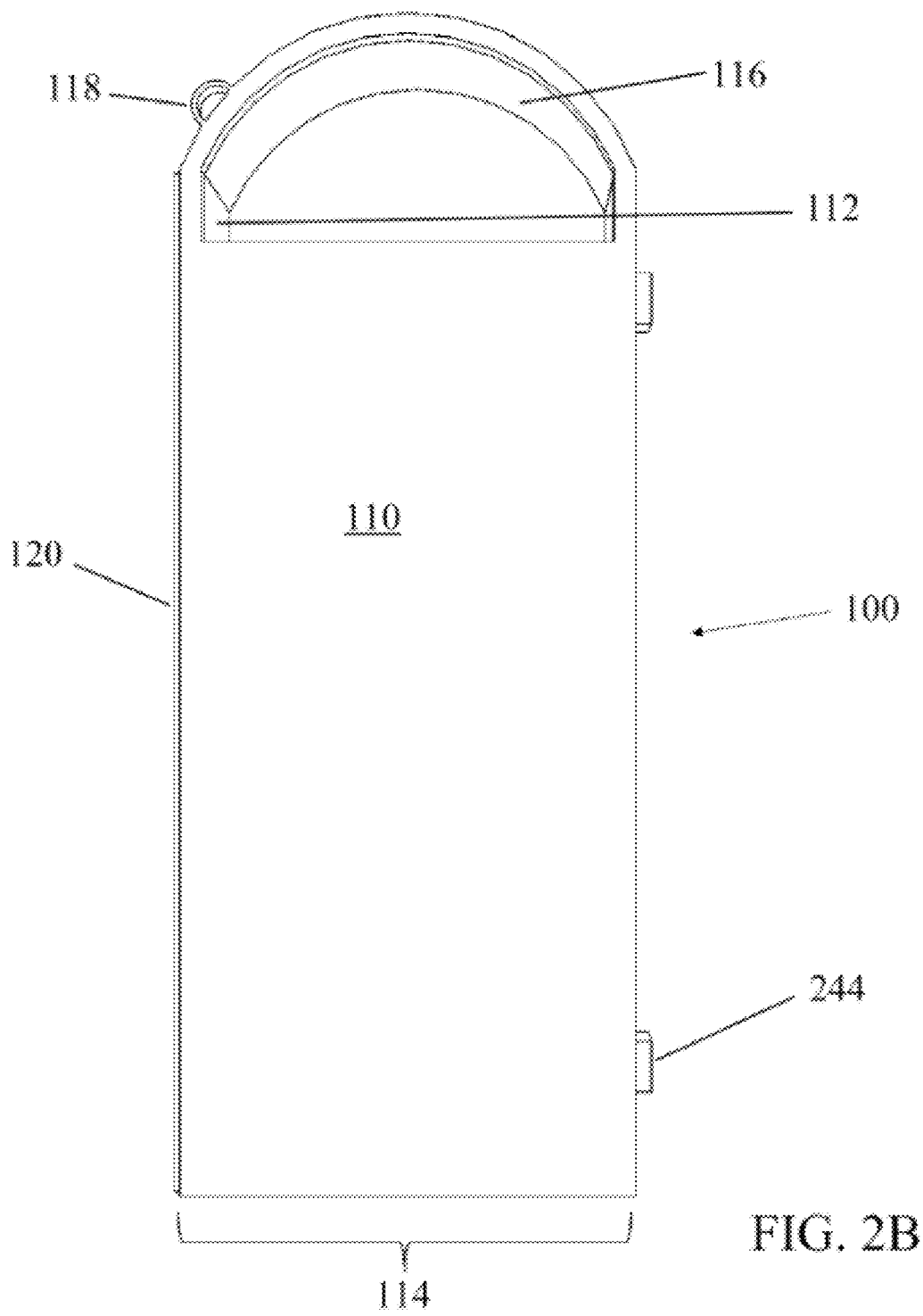

FIGS. 2A and 2B illustrate the device 100 of FIG. 1 in a closed position. As illustrated in FIG. 2A, the lid 110 can be rotated about the hinge 120 in the direction of arrow A. While in the closed position, the lid 110 is positioned above the base 112. In the closed position, the lid 110 serves to enclose the receptacles 124. Once the device 100 is in the closed position, the device 100 can be transported securely without the risk that any inserted media units 126 might fall out or become lost.

Referring now to FIG. 2B, when the device 100 is in the closed position, the lid 110 may be locked to the base 112 using at least one fastener 244. The fastener 244 can securely fasten the lid 110 to the base 112. For example, the fastener 244 may be a snap fit clip, a zipper, a button and loop, a buckle, a clasp, or any other type of known fastener. Using the fastener 244 may further secure against media units 126 falling out of the device 100 during travel.

FIG. 3 shows a bottom view of the device 100 illustrated in FIG. 1. A second writing surface 302 may be attached to or provided on a back surface of the device 100. This second writing surface 302 may have the word "total" displayed on it and may have a dedicated region 304 wherein the total number of media units 126 currently inserted in the receptacles 124 can be recorded. The second writing surface 302 allows the user to enter the total number of the media units 126 presently inserted into the device 100 on the dedicated region 304, so that the user can see how many of the media units 126 should be inserted and if any are missing. For example, if the recorded number on the designated region 304 indicates that eighteen (18) media units 126 should be stored in the device 100, but only seventeen (17) are actually stored in the device 100, the user can quickly determine that one media unit 126 is missing. If desired, the user can further open the lid 110 and compare the written names of the media units on the first writing surface 132 to the corresponding receptacles 124 to determine which of the one or more media units 126 are missing.

The second writing surface 302 may be erasable. The erasability of the second writing surface 302 allows the user to update the total number of media units 126 inserted into the device 100. The second writing surface 302 may have a protective covering 306 that can be applied to keep the total number of the media units 126 recorded on the second writing surface 302 from being accidentally erased. For example, the protective covering 306 may be a clear flap that can be flipped down over the second writing surface 302 along arrow B. However, this is not intended to be limiting as the protective covering 306 may be a sliding window, a clear flap, an applicable decal, or any other known means for protecting a surface. The protective covering 306 can be positioned or applied in any fashion, configuration, or direction, and is not limited to moving along arrow B. Alternatively, instead of the second writing surface 302, the device can include a numeric counter that a user can manipulate (and which may be locked to prevent inadvertent changing).

Figure 4:
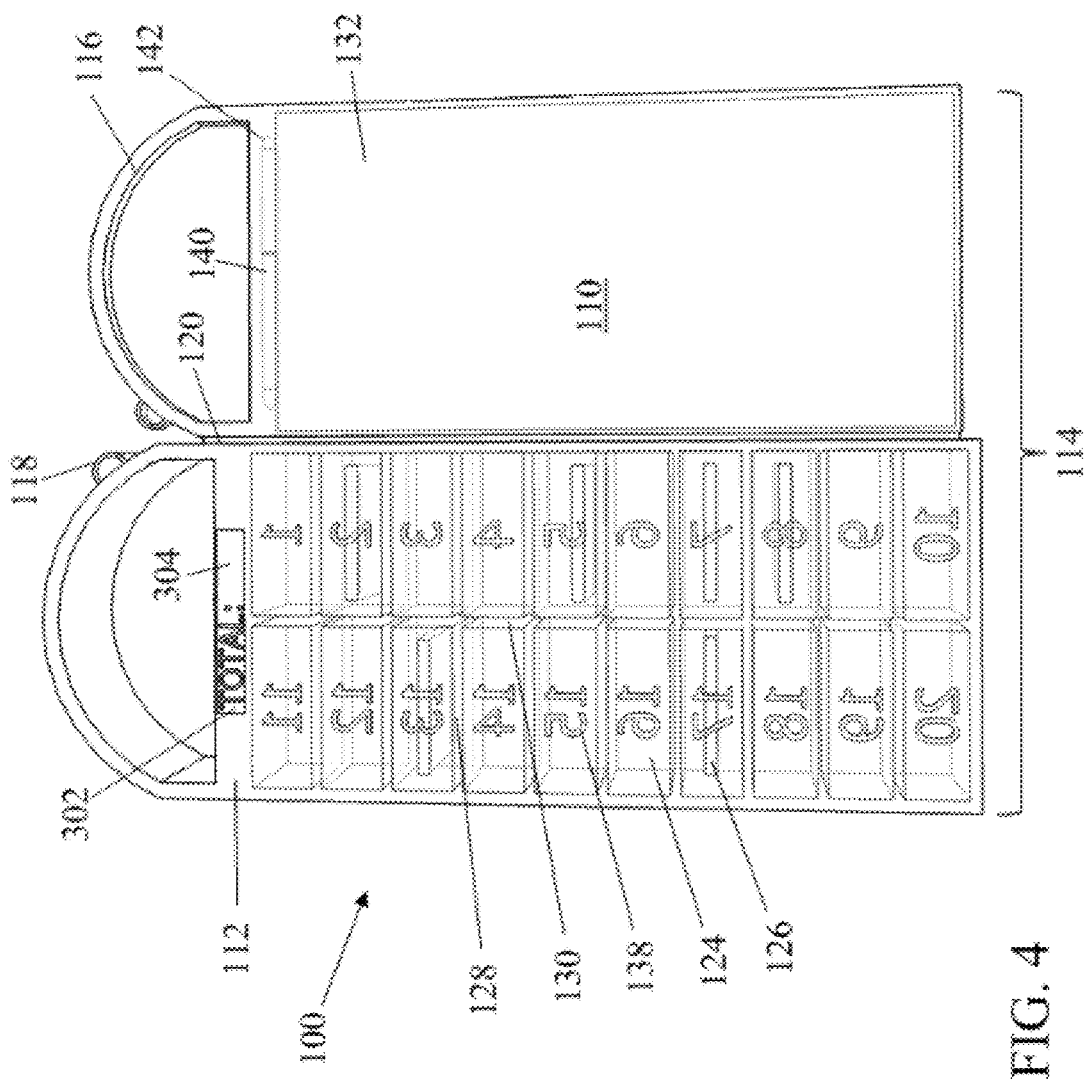
FIG. 4 shows an alternate embodiment of the device where at least a portion of the housing may be made of a material that is at least partially translucent.

FIG. 4 shows an alternate embodiment of the device 100 where at least a portion of the housing 114 may be made of a material that is at least partially translucent. This partially translucent material may be plastic or any other known partially translucent material. By making the housing 114 with at least partially translucent materials, the user can more easily count how many media units 126 are currently inserted into receptacles 124, which can make the recording of the total number of media units on the second writing surface 302 easier. With the housing 114 (e.g., the back surface) made from at least partially translucent materials, a user can readily examine the receptacles 124 without having to open the lid 110. Specifically, the user can count the number of the receptacles 124 that are filled with one of the media units 126 and compare the count with the total number of media units recorded on the designated region 304 of the second writing surface 302 to determine if any media units 126 are missing. The receptacles 124 can also include numbers that can be visible from the back surface of the housing 114. The partially translucent material may be clear or colored.

In one embodiment, the first writing surface 132 may be colored so that it may be visible through the partially translucent base 112 when the lid 110 is closed. For example, the first writing surface 132 being a bright color such as red would show through the partially translucent base 112 more than a neutral color. This bright color would contrast against the media units 126 inserted in the receptacles 124 when viewed from the bottom side of the base 112. The contrast would highlight any empty receptacles 124 and make it easier for the user to determine which of the receptacles 124 contain one of the media units 120 and which do not.

Figure 5:
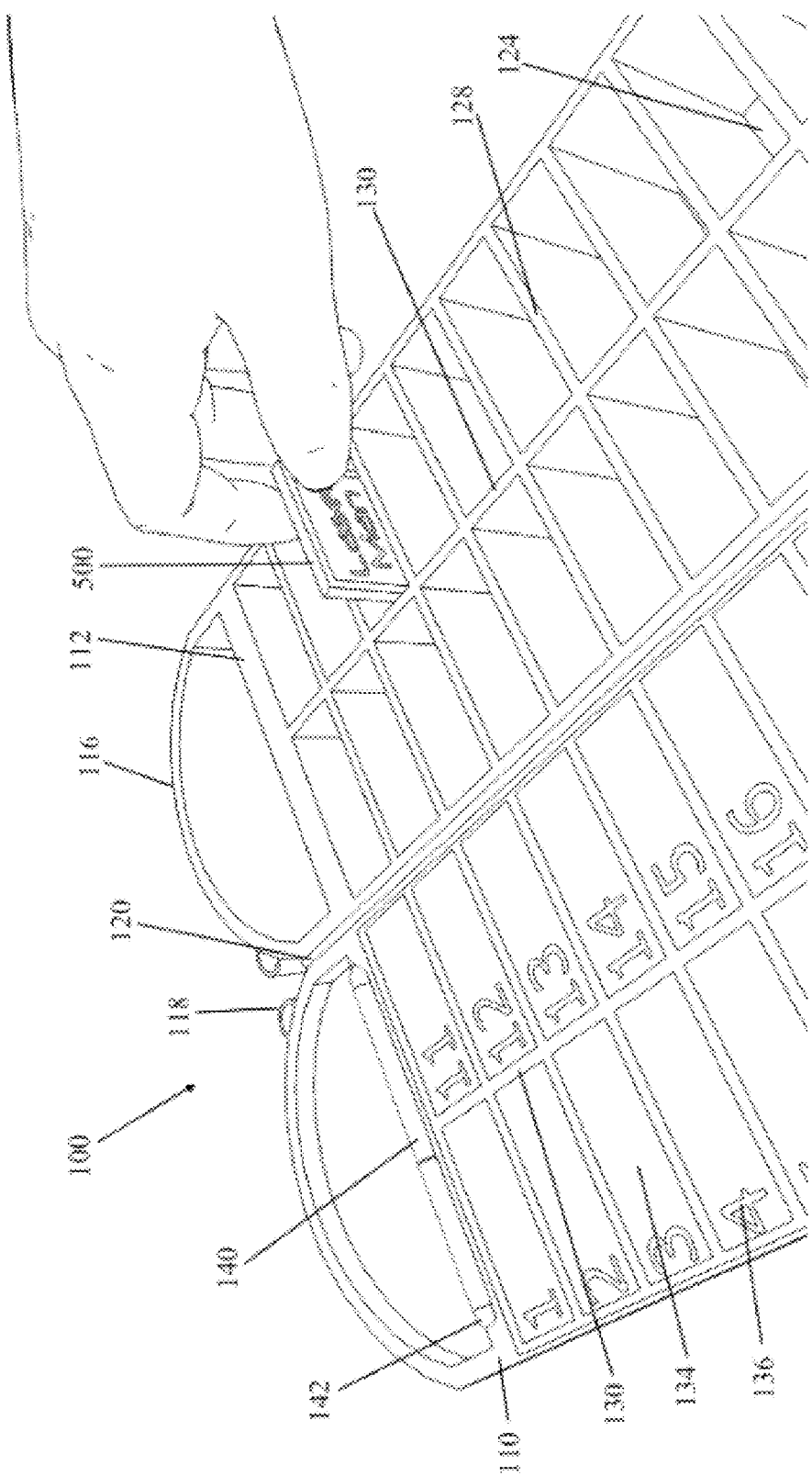
FIG. 5 illustrates exemplary insertion of a particular media unit into the device illustrated in FIG. 1.

FIG. 5 illustrates exemplary insertion of a particular media unit 500 into the device 100 illustrated in FIG. 1. Here, media unit 500 can be inserted into one of the receptacles 124 by a user. If the receptacles 124 are oriented vertically along the z-axis as shown in FIG. 1 and FIG. 5A, rather than horizontally along the x-y plane, a larger number of the media units 126 can be stored in the same area.

Figure 6A:
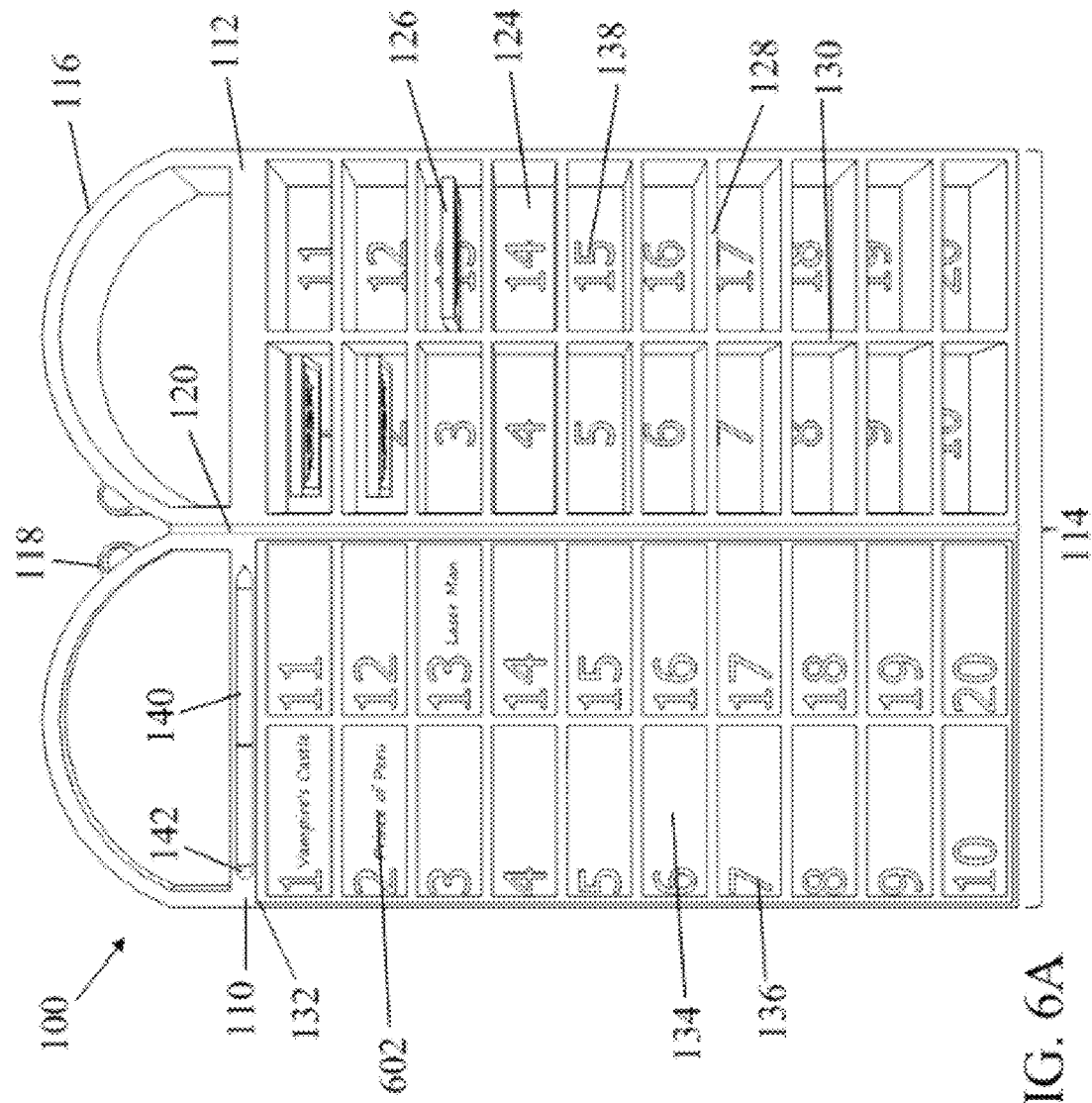

FIGS. 6A and 6B illustrate exemplary notations made on the first writing surface 132 and the second writing surface 302. FIG. 6A shows an embodiment where a user may write in one or more designated regions 134 on the writing surface 132 to label and/or indicate the presence of a media unit 126 in the corresponding receptacle 124. For example, a handwritten note 602 can be the name of the media unit 126 inserted into the corresponding receptacle 124, indicated as slot "2." The handwritten note 602 may provide a reference that enables the user to understand which of the media units 126 is inserted to the corresponding receptacle 124, or determine which media unit 126 is missing if the corresponding receptacle 124 is empty. The references may indicate information such as a title of the media unit 126, an owner of the media unit 126, favorite media units 126, and/or the current user of the media unit 126. Other embodiments may also include one or more of: (i) a box (e.g., check-box) in the designated region 134 that could be checked when media units 126 are removed, (ii) an area in designated region 134 where the user could write his or her name/initials when removing a media unit 126, or (iii) any other known form of notation.

FIG. 6B shows an embodiment where a user may write on the designated region 304 on the second writing surface 302 a total number of the media units 126 stored in the receptacles 124 of the device 100. For example, a handwritten number 650 could be written on the designated region 304 to indicate the total number of media units 126 stored in the receptacles of the device 100. The handwritten number 650 can subsequently be used to determine if all of the expected media units 126 are presently inserted into the device 100, or if any of the media units 126 expected to be stored in the device 100 are missing.

Figure 7B:
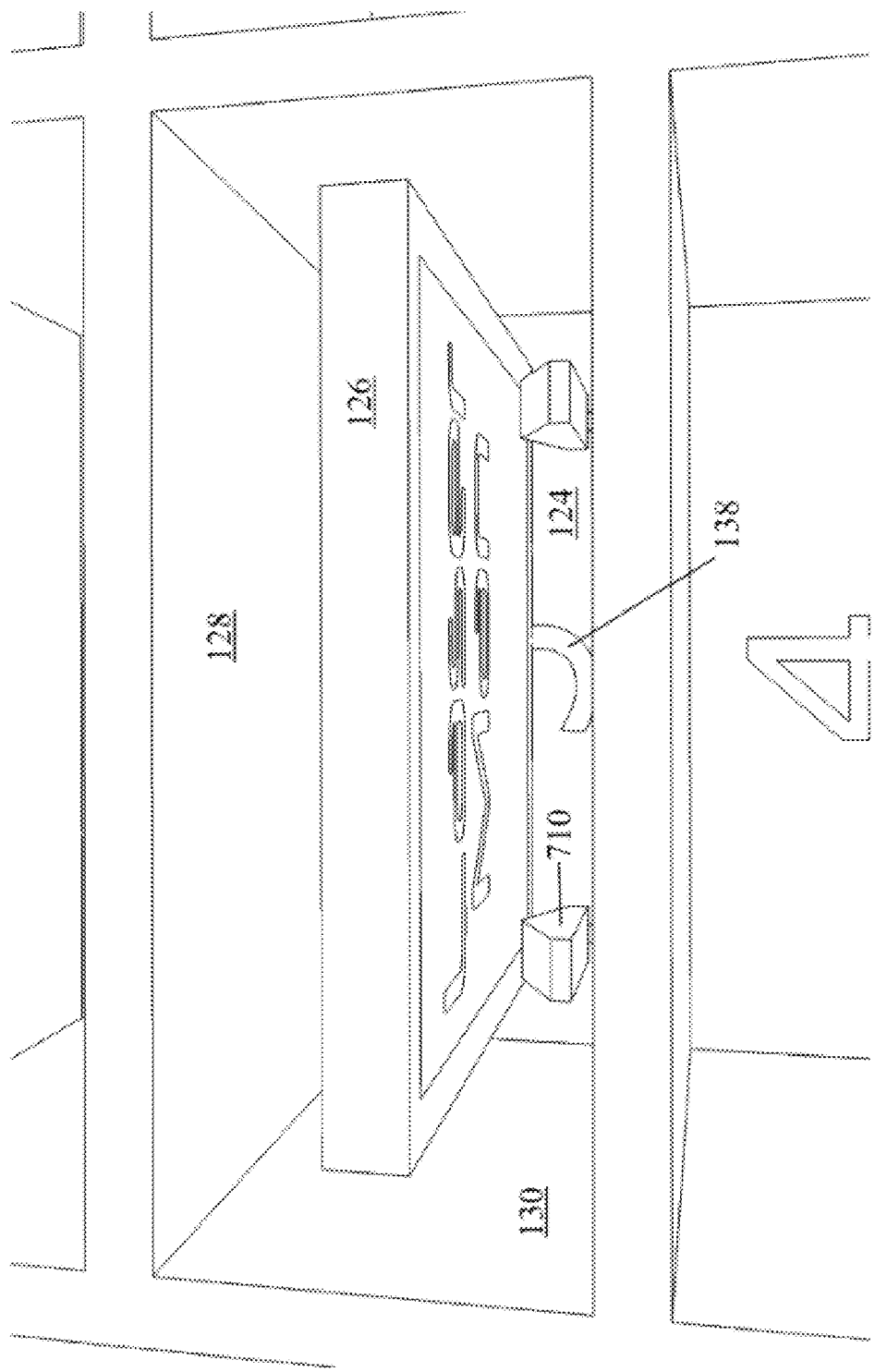

FIGS. 7A-7C illustrate close-up views of the receptacle 124 of the device 100 having at least one mechanical member 710. FIG. 7A is a perspective top view of the receptacle 124 without the media unit 126. FIG. 7B is a perspective top view of the receptacle 124 within the media unit 126 provided therein. FIG. 7C illustrates a cross sectional side perspective view of the device 100 with the media unit 126 inserted into the receptacle 124 secured by a mechanical member 710.

The mechanical member 710 is used to secure one of the media units 126 within the receptacle 124. The mechanical member 710 may help ensure that the inserted media unit 126 will remain in the correct receptacle 124 and will not be lost. The mechanical member 710 may be a clip that includes at least one movable arm that applies tension to secure the media unit 126 (See FIGS. 7B and 7C) within the corresponding receptacle 124. The mechanical member 710 may also be at least one spring that applies tension to secure the media unit 126 within the corresponding receptacle 124, a foam cutout, a replica of a media player receiver for media units, or any other known means to secure the media unit 126.

Figure 8:
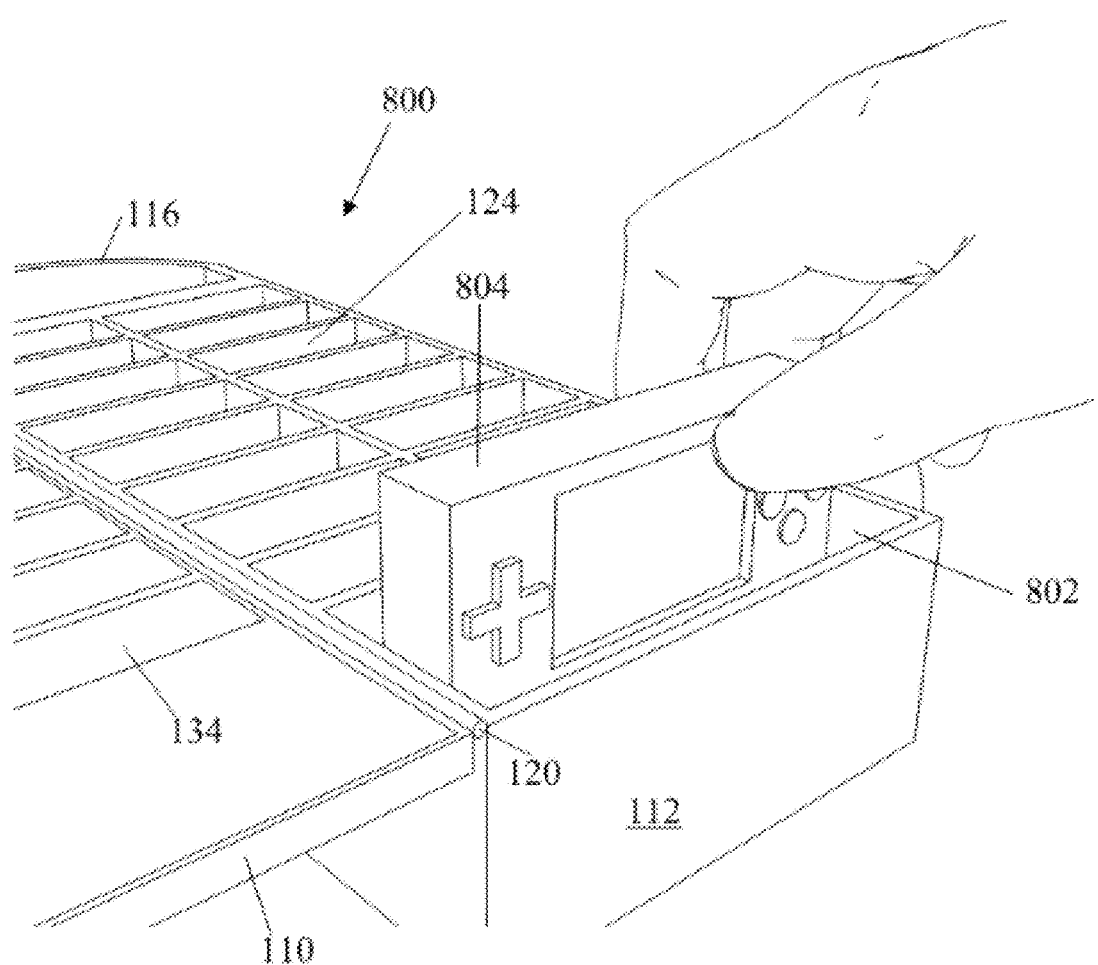
FIG. 8 illustrates a perspective view of a device to store media units according to another embodiment.

FIG. 8 illustrates a perspective view of a device 800 to store media units according to another embodiment. Although the device 800 is generally similar to the device 100 illustrated in FIG. 1, the device 800 includes at least one receptacle 802 that is configured to store a portable media player 804. Otherwise, the receptacles 124 are configured to hold the media units 126 just as in the device 100 illustrated in FIG. 1. This embodiment would allow the user to transport both the media player 804 and the media units 126 in the device 800.

Figure 9:
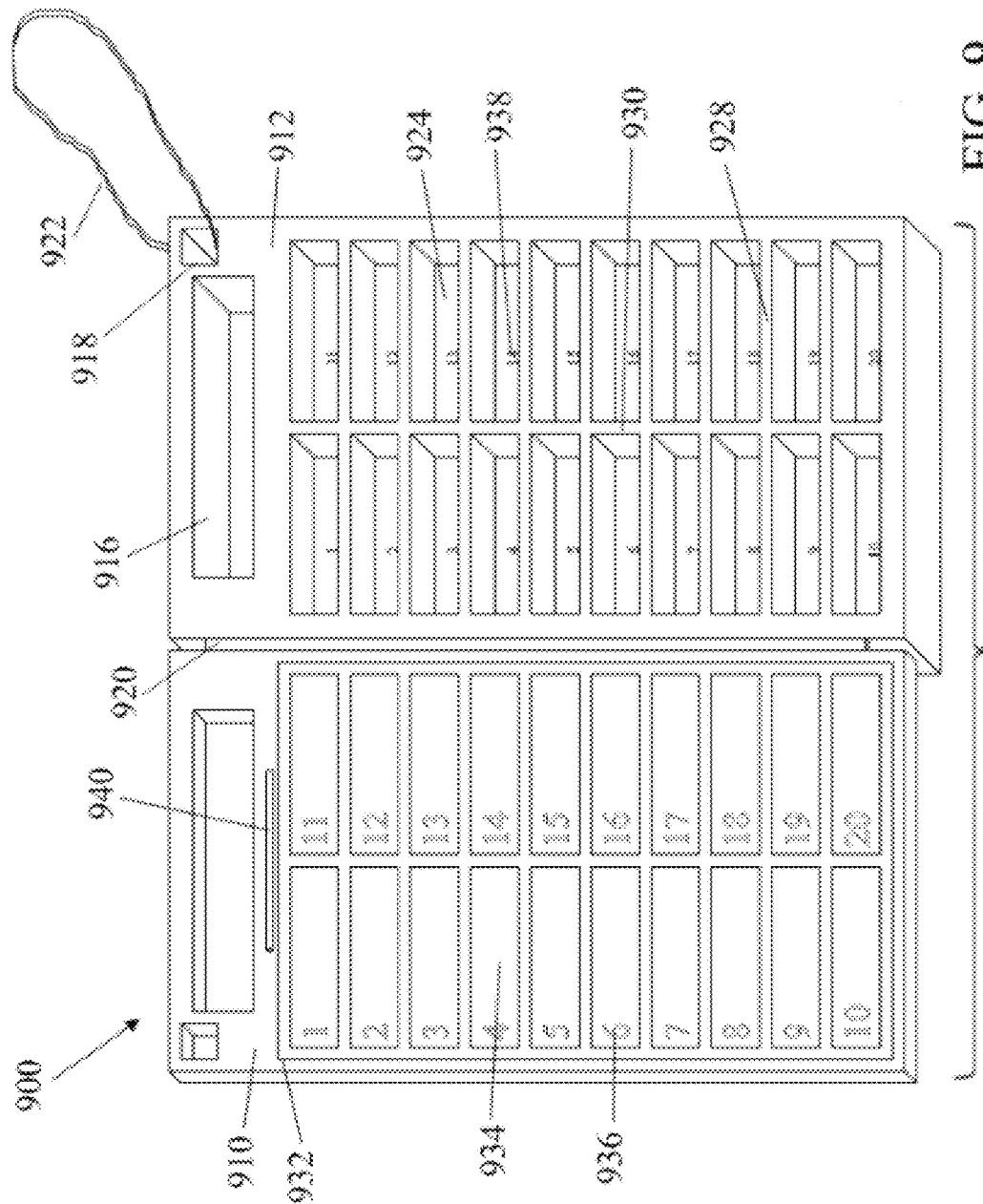
FIG. 9 shows a top view of a device to store media units, according to another embodiment.

FIG. 9 shows a top view of a device 900 to store media units, according to another embodiment. The device 900 may have a lid 910 and a base 912 coupled together with a hinge 920 to form a housing 914. A handle 916 may be integrated with or coupled to the housing 914 to allow the user to carry the device 900. The device 900 may have an aperture 918. The aperture 918 may be designed to receive a carrying means 922 to allow a user to transport the device easily. The carrying means 122 may be a strap, clip, lanyard, carabiner, hook, or any other similar known means to assist the user in carrying the device 900. The interior of the housing 914 may have a plurality of receptacles 924 in the base 912 that can receive a media unit 126. The receptacles 924 can be any shape or size. The device 900 may also have a first writing surface 932 coupled to the interior of the lid 910 or anywhere else on the housing 914. The first writing surface 932 may have a plurality of designated regions 934, where each of the designated regions 934 corresponds to one of the receptacles 924. The first writing surface 932 may be erasable. A stylus 940 or any type of pen or other writing instrument may be included with the device 900. There may also be an eraser 942 coupled to the end of the stylus 940.

The device 900 is generally similar to the device 100, but illustrates that features such as the handle 916 and aperture 918 may be in any shape, size, or location on the device 900. For example, FIG. 9 illustrates the handle 916 in a rectangular configuration rather than the curved handle 116 of the embodiment shown in FIG. 1. The aperture 918 may be disposed on the interior of the lid 910 or base 912, and may be rectangular, rather than the circular aperture 118 on the outside of the housing 114 shown in the embodiment of FIG. 1.

Figure 10:
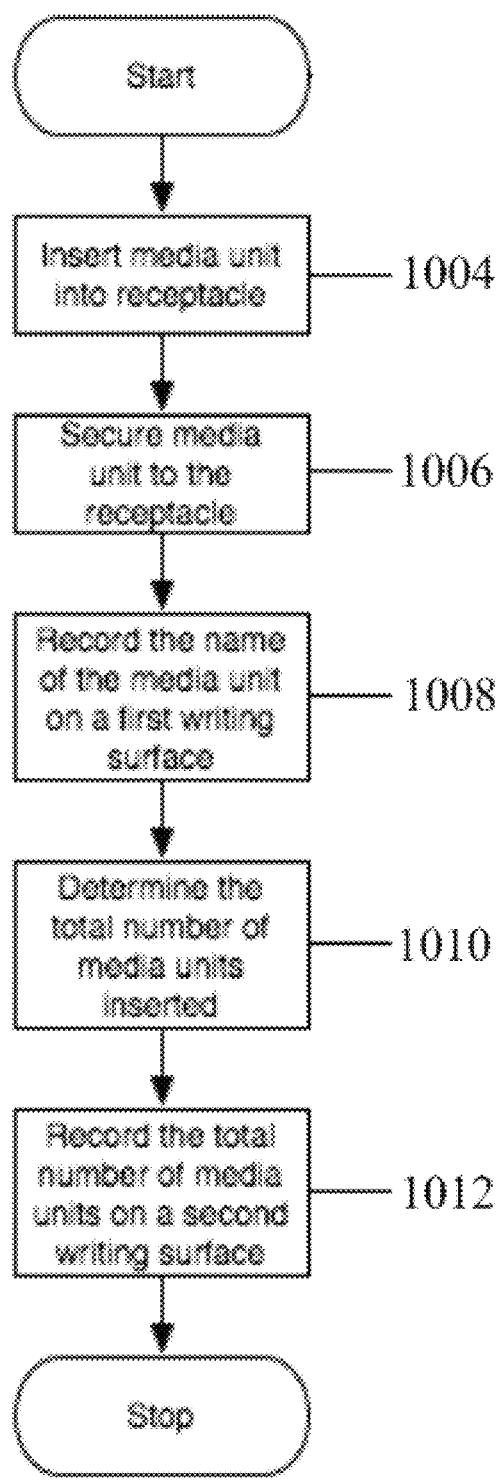
FIG. 10 shows a method for organizing media units according to one embodiment.

FIG. 10 shows a method for organizing media units according to one embodiment. At 1004, a media unit can be inserted into a receptacle in a housing. At 1006, the media unit may be secured to the receptacle. Securing the media unit to the receptacle may be accomplished through the use of a mechanical member, as shown in FIGS. 7A-7C. This mechanical member may include a clip, a spring, a foam cutout, a replica of a media player receiver for media units, or any other known means of securing a media unit to the receptacle. At 1008, the user may record a name of the media unit on a corresponding region of a first writing surface. The first writing surface may be attached to the housing. At 1010, the user may count a total number of media units inserted into the receptacles. At 1012, the user may record the total number of media units inserted into the housing on a second writing surface. The second writing surface may be attached to the housing.

Figure 11:
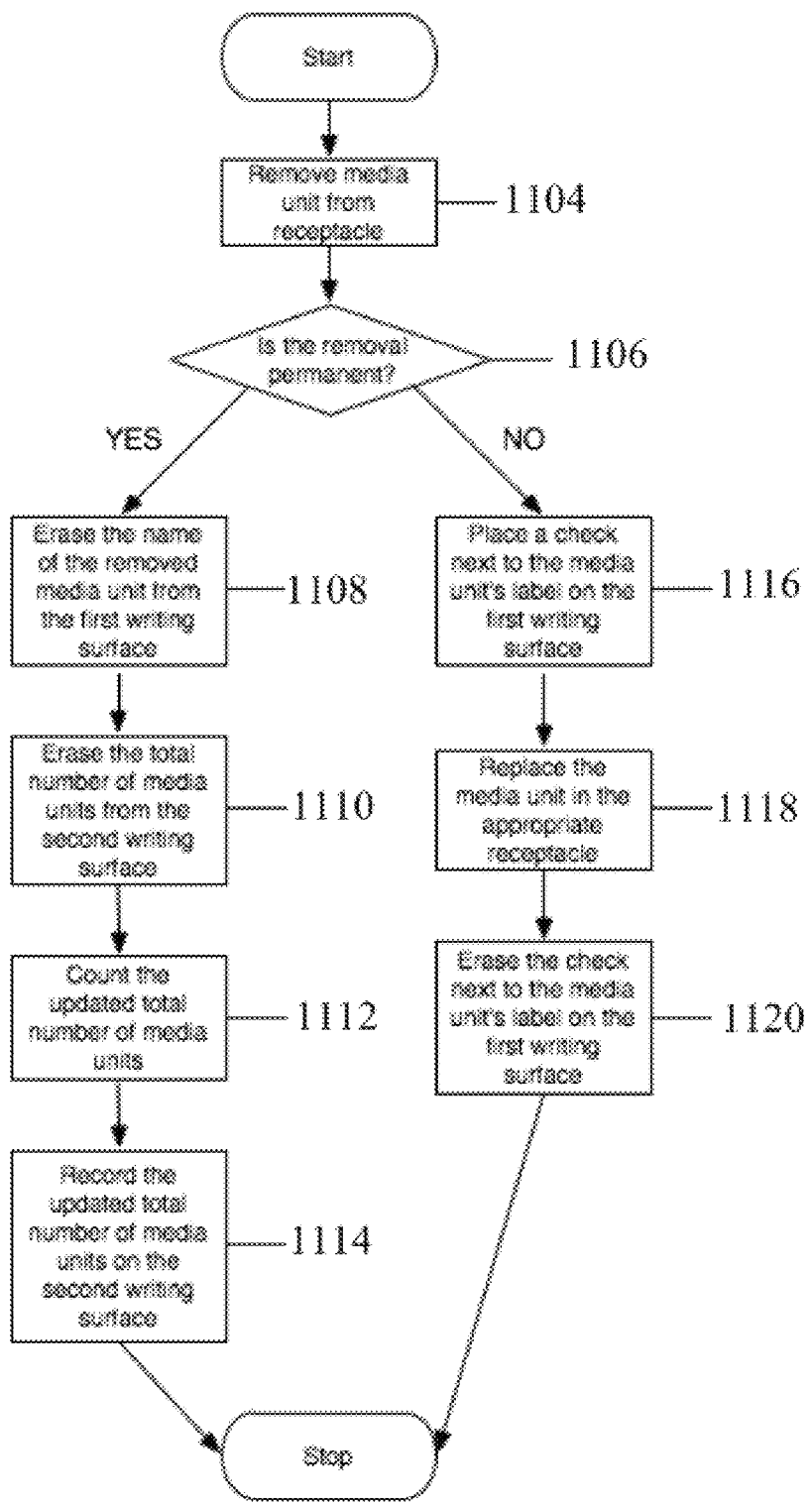
FIG. 11 shows a method for removing media units.

FIG. 11 shows a method for removing media units. At 1104, the user can remove a media unit from the slot. At 1106, the user can decide whether the removal will be permanent or temporary. The first writing surface and the second writing surface may be erasable. At 1108, if the removal will be permanent the user can erase the name of the media unit from the corresponding region on the first writing surface. At 1110, the user can then erase the total number of media units from the second writing surface. At 1112, the user can then count the total number of media units, which can be facilitated by the numbered slots and corresponding number and writing surface. At 1114, the user can then record the new total number of media units inserted into the housing on the second writing surface.

At 1116, if the removal will be only temporary the user may check a box next to the corresponding label on the first writing surface to indicate that a media unit has been removed. Alternatively, the user may write his or her name/initial on the label or make some other form of notation to indicate that the media unit has been removed. At 1118, the user may then replace the media unit in the appropriate receptacle after using the media unit. At 1120, the user may then erase the check or other form of notation next to the corresponding label on the first writing surface.

Figure 12:
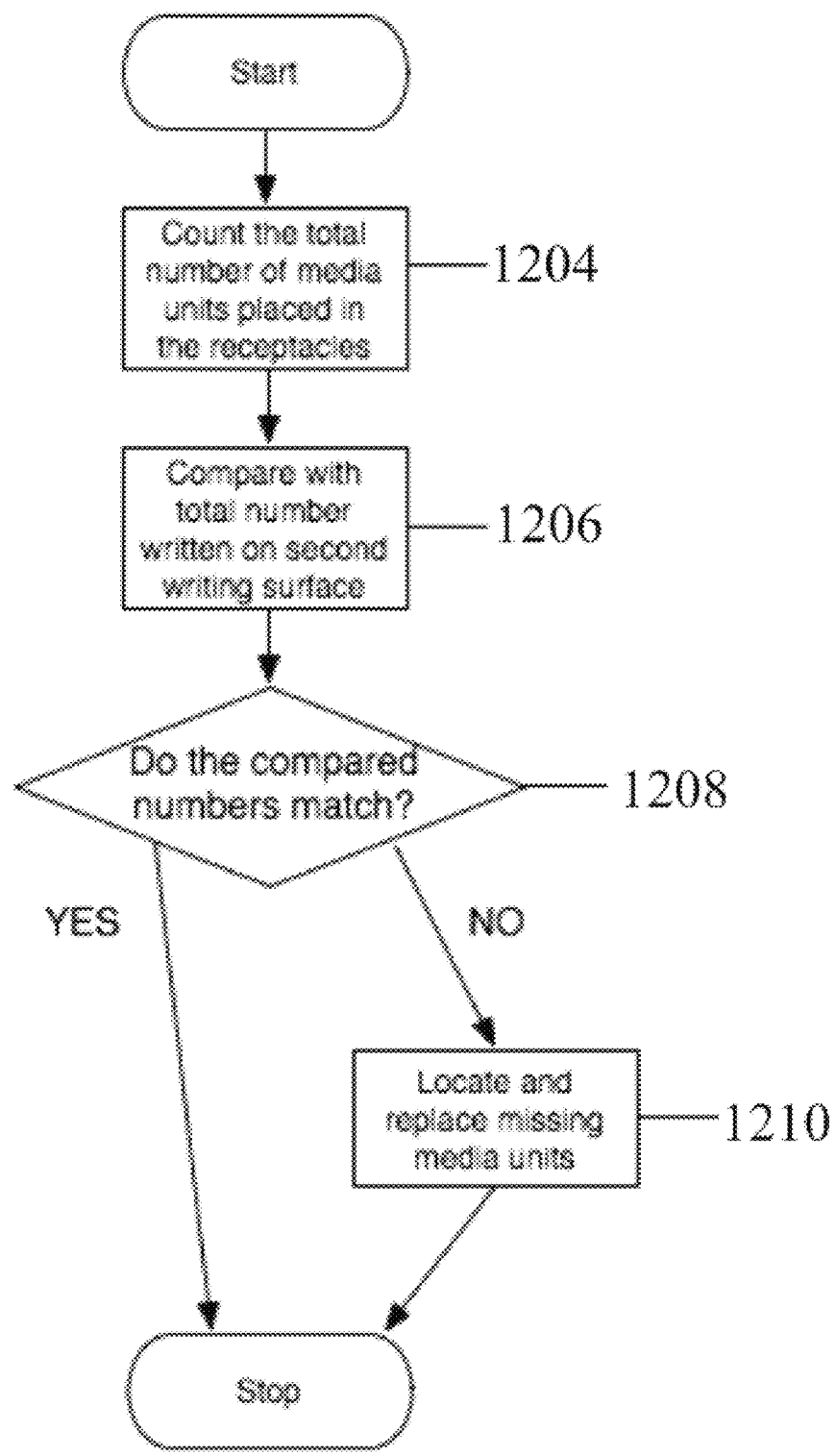
FIG. 12 shows a method for determining if any media units are misplaced or missing from the device.

FIG. 12 shows a method for determining if any media units are misplaced or missing from the device. At 1204, the user may count how many media units are inserted into the case. At 1206, the user may then compare that number with the total number of media units recorded on the second writing surface at 1012. At 1208, the user may then determine if the two numbers are equal to each other. At 1210, if the compared numbers do not match, the user will be able to determine how many media units are missing. This determination, along with the notations or names recorded on the first writing surface at 1008, may assist the user in identifying and locating any missing media units. The missing media units may then be replaced within the appropriate receptacles.

While embodiments and applications of this invention have been shown and described, it would be apparent to those skilled in the art having the benefit of this disclosure that many more modifications than mentioned above are possible without departing from the inventive concepts herein.

What is claimed is:

1. An apparatus for storing media units, comprising:
a housing having a lid and a base, the base having a plurality of receptacles, each of the plurality of receptacles having a plurality of walls, and each of most of the plurality of receptacles being capable of receiving an electronic game cartridge; and
a first writing surface coupled to the an inner surface of the lid of the housing,
wherein the first writing surface is erasable, and
wherein the housing is at least partially translucent.

2. The apparatus of claim 1, wherein the first writing surface is a whiteboard or a dry erase board.

3. The apparatus of claim 1, further comprising:
a second writing surface coupled to the housing, wherein the second writing surface is erasable.

4. The apparatus of claim 1, further comprising:
a hinge disposed between the lid and the base.

5. The apparatus of claim 1, wherein the second writing surface includes a space to write a total number of electronic game cartridges stored within the housing.

6. The apparatus of claim 1, wherein at least one of the plurality of receptacles is configured to hold a portable game player.

7. The apparatus of claim 1, wherein each of the plurality of receptacles have a mechanical member configured to secure one of the electronic game cartridges within the corresponding receptacle.

8. The apparatus of claim 7, wherein the mechanical member applies tension to secure the one of the electronic game cartridges within the corresponding receptacle.

9. An apparatus for storing cartridges, comprising:
a housing having a lid, a base and a plurality of receptacles, the lid having a first interior, a first exterior, a first front edge, and a first back edge; the base having a second interior, a second exterior, a second front edge, and a second back edge, the second back edge of the base hingedly coupled to the first back edge of the lid, the plurality of receptacles each having a plurality of walls, the plurality of receptacles being configured to receive cartridges to be stored by said apparatus, the plurality of walls being coupled to the second interior of the base; and
a first writing surface coupled to the first interior of the lid of the housing, the first writing surface having a plurality of regions for providing labels for the plurality of receptacles, the plurality of regions corresponding to the plurality of receptacles, and the first writing surface being erasable;
an aperture disposed in the housing for attaching a strap or other carrying means; and
means for fastening and unfastening the first front edge of the lid to the second front edge of the base.

10. The apparatus of claim 9, further comprising:
a second writing surface coupled to the base of the housing, the second writing surface having a space to write a total number of cartridges stored within the housing, wherein the second writing surface is erasable.

11. The apparatus of claim 10, further comprising:
a protective covering coupled to the housing and configured to cover the second writing surface.

12. The apparatus of claim 9, further comprising:
a handle coupled to the housing.

13. The apparatus of claim 9, wherein the first writing surface is an erasable whiteboard.

14. The apparatus of claim 9, wherein each of the plurality of receptacles have a mechanical member configured to secure one of the cartridges within the corresponding receptacle.

15. The apparatus of claim 9, wherein the plurality of regions on the first writing surface each have an area available to be marked with a visual indication when a corresponding cartridge is removed from the housing.

16. The apparatus of claim 9, wherein the cartridges to be stored by said apparatus are media game cartridges.

17. The apparatus of claim 9, wherein the housing further comprises an area configured to hold a portable game player.

* * * * *